Dec. 23, 1924.
F. JOHN
ROTARY KEY CLUTCH
Filed May 26, 1924
1,520,351
2 Sheets-Sheet 1
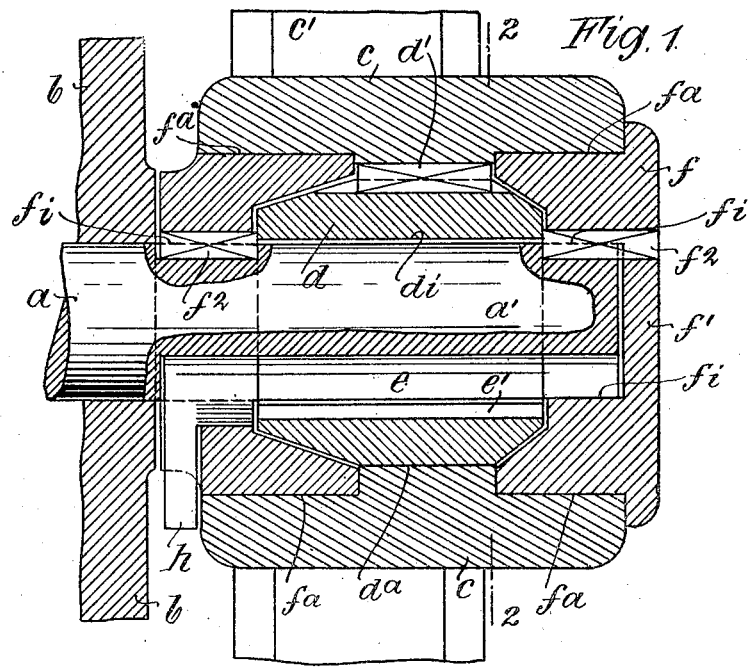
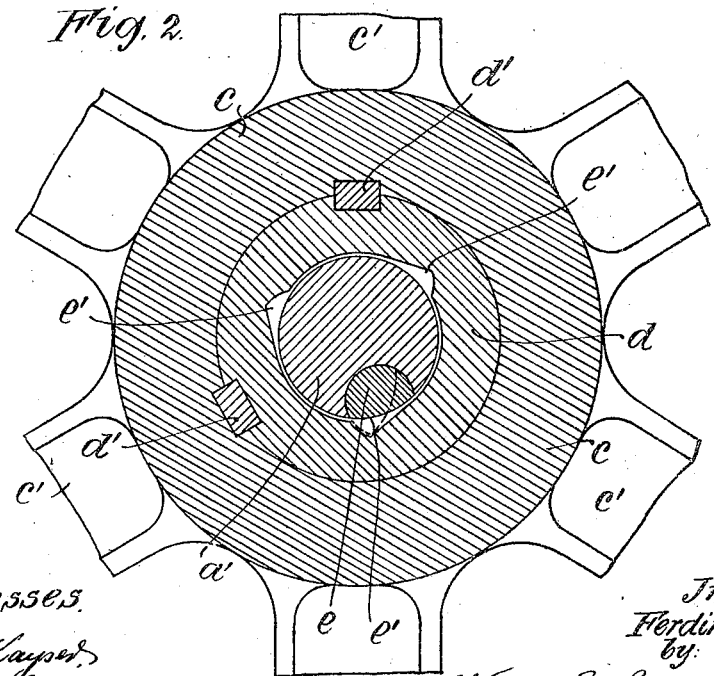

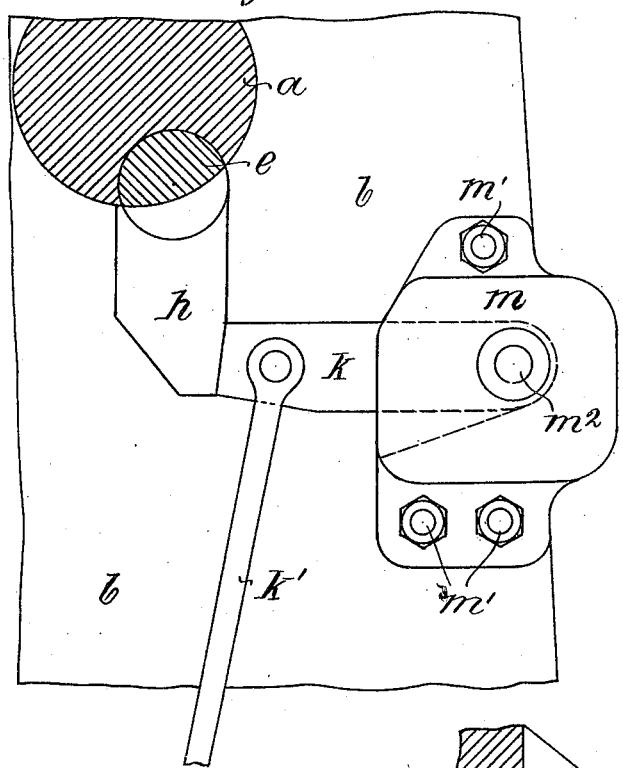
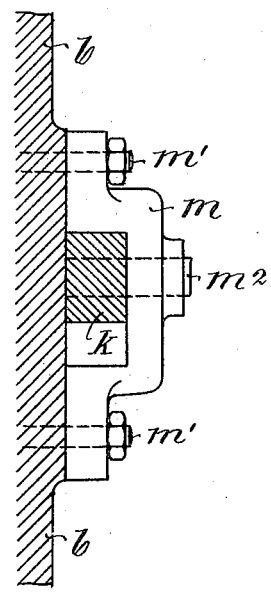
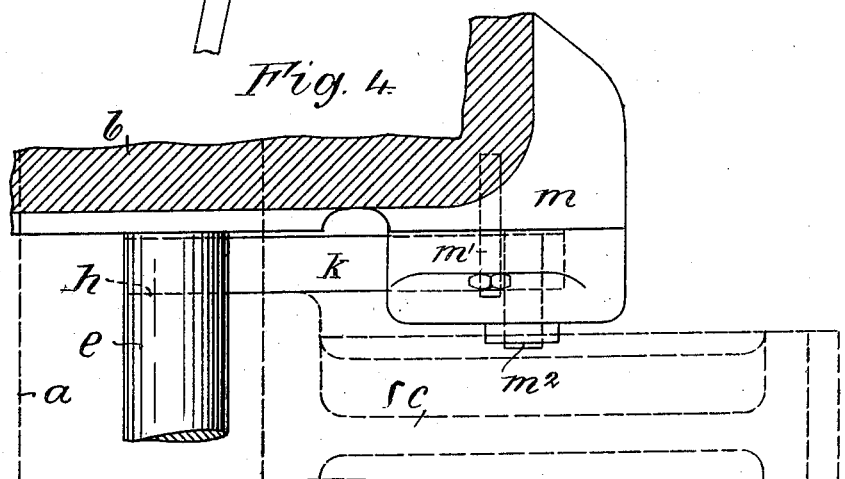

Patented Dec. 23, 1924.

1,520,351

UNITED STATES PATENT OFFICE.

FERDINAND JOHN, OF DUSSELDORF, GERMANY.

ROTARY KEY CLUTCH.

Application filed May 26, 1924. Serial No. 716,045.

*To all whom it may concern:*

Be it known that I, FERDINAND JOHN, a citizen of Germany, and a resident of Dusseldorf, Germany, have invented certain new and useful Improvements in Rotary Key Clutches, of which the following is a specification.

This invention relates to rotary key clutches such as those employed in the driving mechanism of excentric presses in which a transmission flywheel or its equivalent is mounted on the stub extension or driving shaft of the press element.

The object of the present invention is to bring the flywheel as close as possible to the press element in order to avoid undesirable stresses on the stub shaft, particularly those due to the shock of starting and also to relieve the stress on the stub shaft due to the sudden action of the rotary key when coupling the rotating-flywheel to the stub shaft.

For this purpose it is necessary that the rotary key should have a large surface contact with the groove or recess cut in the stub shaft and consequently it must be kept relatively long owing to its limited diameter. On the other hand, however, the flywheel must rotate on the stub shaft when the latter stops, thus necessitating the provision of sufficient bearing surface between the flywheel and shaft.

According to this invention, the rotary key clutch comprises a driving bush keyed to the hub of the flywheel and stepped bearing bushes engaging stepped bearing surfaces formed on the stub shaft, driving bush and wheel hub, such that the bearing surfaces of the driving and bearing bushes are of greater area than the surfaces thereof fixed or keyed to the wheel hub and shaft.

The present invention also comprises a compact arrangement of the actuating lever for the rotary key, as hereinafter described.

The improved construction of rotary key clutch is illustrated by the accompanying drawings whereon:—

Fig. 1 is a partial axial section through the clutch.

Fig. 2 is a cross-section on the line 2—2 of Fig. 1.

Figs. 3, 4 and 5 are side, plan and edge views of the control mechanism for the rotary key.

Referring to Figs. 1 and 2, the driven shaft $a$ is mounted in the press element $b$ and the flywheel hub $c$ is mounted on the stub end $a'$ of the shaft $a$. Keyed to the hub $c$ by means of a key $d'$ is a driving bush $d$. The rotary key $e$ fits in the usual manner in a recess in the stub shaft $a'$ and is adapted when rotated to engage one of a series of grooves or notches $e'$ in the driving bush $d$.

On each end of the bush $d$ is mounted a bearing bush $f$, the outer one being formed with a cap or cover $f'$ for the end of the stub shaft. Both bushes $f$ are keyed by keys $f^2$ to the stub shaft $a'$.

As shown in Fig. 1, the bushes $f$ are of stepped formation to engage over bearing surfaces on the bush $d$. By this construction, the surfaces which are always in stationary contact with one another are of smaller area than the contact surfaces subject to relative motion.

Between the stub shaft $a'$ and the inner surface $di$ of the bush $d$ it is desirable that the contact should be ample, because the length of this surface and consequently that of the key way $e'$ is essential to the permanent efficient working of the key. On the other hand, the outer surface $da$ of the bush $d$ may be kept relatively small because it is keyed to the hub $c$. Similarly the inner surfaces $fi$ of the bushes $f$ can be kept small owing to the fact that they are keyed to the stub shaft $a'$, but the outer surfaces $fa$ must be as large as possible because the flywheel runs idly on these surfaces.

By nesting the three bushes together as shown in Fig 1 it is possible to provide ample bearing surfaces with a comparatively short hub $c$. The flywheel $c'$, as seen in Fig. 1, can also be brought very close to the press element $b$. This can be attained still further by making the stepped portions of the bushes $f$ of unequal length so that one bush extends further over the driving bush $d$ than the other, as shown in Fig. 1.

Space must be provided between the flywheel hub $c$ and the press element $b$ to accommodate the arm $h$ of the rotary key $e$ (see Fig. 1) and its operating parts and it is important that the arm $h$ and its operating parts should be kept as small as possible in the direction of the length of the stub shaft. These requirements are fulfilled by the construction of the parts shown in Figs. 3, 4 and 5. The key is controlled by a stop lever $k$, which in the usual manner, can be depressed by a pull rod $k'$ to release the arm $h$ for engaging the clutch.

In the construction illustrated, the stop lever $k$ is pivoted on a pin $m^2$ within a bridge-piece $m$ secured to the press element $b$ by studs $m'$. It will be seen from Fig. 4 that the stop lever $k$ can lie close to the press element $b$ and that the hub $c$ of the flywheel only requires to be at a distance from the press element $b$ equal to the thickness of the lever $k$.

Claims:

1. A rotary key clutch comprising a shaft having a keyway therein, a notched driving bush, a rotary key journaled in said keyway, a pair of stepped bearing bushes partially overlapping the driving bush and a flywheel or its equivalent having a stepped hub running on said bearing bushes and fastened to the driving bush, whereby the bearing surfaces of the driving and bearing bushes are of greater area than the surfaces fixed to the wheel hub and shaft, substantially as described.

2. A rotary key clutch comprising a shaft having a keyway therein, a driving bush on said shaft having keyways in its inner surface, a key rotatable in the shaft keyway, an operating arm on said key, a pair of coned bearing bushes fitting conical bearing surfaces on said driving bush, said bearing bushes being keyed to said shaft and a hub member rotatable on said bearing bushes and keyed to said driving bush.

3. In an excentric press, the combination, with the press element of a rotary key clutch as claimed in claim 2, of a bridge-piece secured to the side of the press element, a stop lever for the arm of the rotary key, said lever being pivoted within the bridge piece whereby the hub member may be brought close up to the press element, and a pull-rod for controlling the stop lever.

The foregoing specification signed at Cologne, Germany, this 8th day of May, 1924.

FERDINAND JOHN.

In the presence of two witnesses:
M. FOHR,
S. W. NEULEN.